Nov. 17, 1959  H. H. HORAK  2,912,821
VALVELESS INLET FOR PULSE JET

Filed July 25, 1958  2 Sheets-Sheet 1

INVENTOR.
HOBBS H. HORAK

United States Patent Office 2,912,821
Patented Nov. 17, 1959

2,912,821

VALVELESS INLET FOR PULSE JET

Hobbs H. Horak, Oxon Hill, Md.

Application July 25, 1958, Serial No. 751,099

3 Claims. (Cl. 60—35.6)

(Granted under Title 35, U.S. Code (1952), sec. 266)

The invention described herein may be manufactured and used by or for the Government of the United States of America for governmental purposes without the payment of any royalties thereon or therefor.

This invention relates to gas turbine power plants and more particularly to the combustion chamber construction of pulse jet engines.

As is well known in jet power plant operation, air is introduced at the inlet or front end and mixed with fuel, and combustion of the air-fuel mixture takes place in a combustion zone adjacent the inlet end or in an afterburner rearwardly thereof. The heated high pressure combustion gas is expanded through the exhaust duct or rear end of the power plant and is discharged at high velocity to provide propulsion.

Mechanical valves of the vane type or some means of providing a turbulent cross flow at the inlet end of the combustion chamber have heretofor been utilized to prevent the exit of gases, after combustion, through the inlet or conversely to direct the gases toward the exhaust. Some prior arrangements have presented problems in operation, for example the mechanical valves have been found to have short life and require frequent replacement while the structure for effecting the turbulent cross flow has not been very effective in directing the combustion gases through the exhaust.

The present invention is directed to a valveless inlet for a pulse jet engine in which the primary inlet air is directed into a central opening of a baffle which is disposed upstream of a combustion chamber and the secondary air is directed around said baffle. The baffle is so arranged as to permit the passage of the inlet air into the combustion chamber, and yet prevent the combustion gas discharge, or the reverse flow of the air fuel mixture through the inlet. It will be understood that when combustion takes place within the power plant, a pressure rise occurs causing an adverse pressure differential between the zone of combustion and the air inlet. A resultant flow of some of the combustion gases in the direction opposite to the incoming inlet air would normally take place but, by the provision of the baffle of the present invention in the combustion chamber, directional vortices are formed and so disposed as to cause the flow to be effectively blocked until sufficient energy is expended to reverse the direction of rotation or movement of the vortices.

Accordingly, it is a broad object of this invention to design a pulse jet power plant which directs the combustion gases through its exhaust end with a minimum of reverse flow and having no moving parts.

It is another object of this invention to provide pulse jet engine apparatus for producing directional vortices at the inlet end of a combustion zone which effectively blocks the forward discharge of combustion gases and reverses the flow toward the exhaust end.

Other objects will become apparent from a more detailed understanding of the invention.

Figure 1:
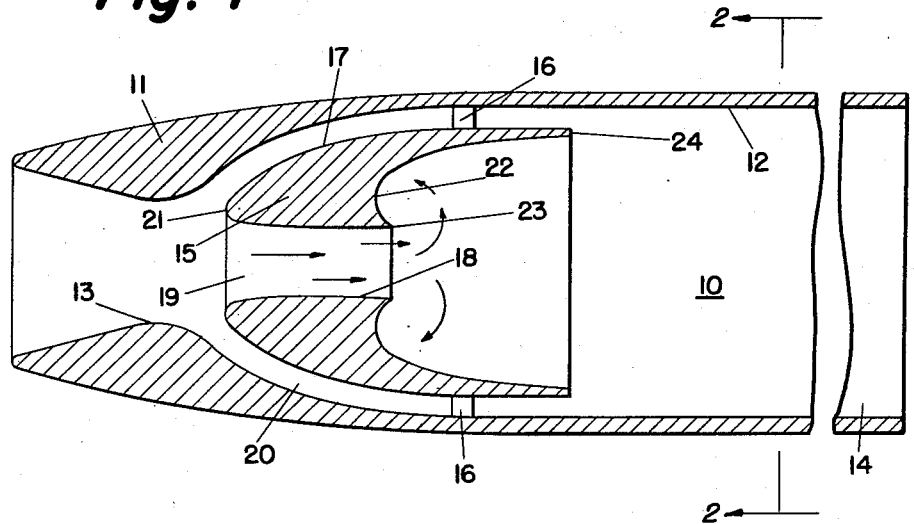
Fig. 1 is a longitudinal broken sectional view of a portion of a pulse jet engine illustrating one embodiment of the invention.

Referring to Fig. 1, the combustion chamber of a pulse jet engine is shown generally at 10. The engine is formed by a casing having an outer wall 11 and inner wall 12 and has the usual venturied air inlet end 13 and exhaust end 14 with the combustion chamber 10 therebetween. Fuel supply means and ignition means of any type may be provided for initiating combustion in combustion chamber 10.

In order to effect the objects of the present invention a baffle 15 is provided and disposed adjacent the venturied inlet 13 and between it and the combustion chamber 10 and is axially within the combustion zone.

As shown in Fig. 1, the baffle 15 is spaced from the inner wall 12 of the casing or shell by struts 16 and has an outer surface 17 which generally follows the flaring configuration of the casing and an inner surface 18. An axial passage 19 for primary air and an outer passage 20 for secondary air are thus formed through which the inlet air passes into the combustion chamber 10. If mixing of the primary and secondary air is not desired, the outer surface of baffle 15 will be extended to form, in effect, a jet casing, obviating the need for the cylindrical casing.

Figure 2:
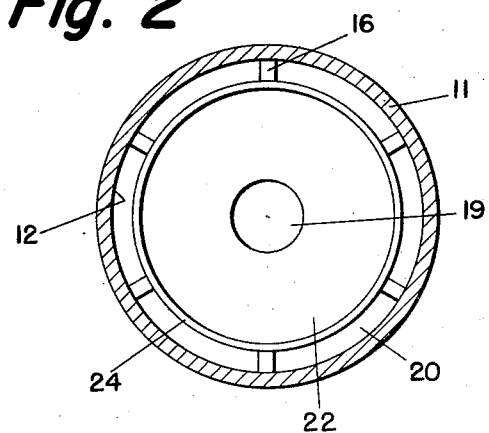
Fig. 2 is a cross-sectional view taken along line 2—2 of Fig. 1.

The outer and inner surfaces 17 and 18 merge to form forward end 21 and these surfaces are connected at their rear edges by a cavity wall 22 which forms inner and outer cusps 23 and 24 respectively of generally arcuate shape all as is shown in connection with the baffle 15 of Fig. 2.

Figure 3:
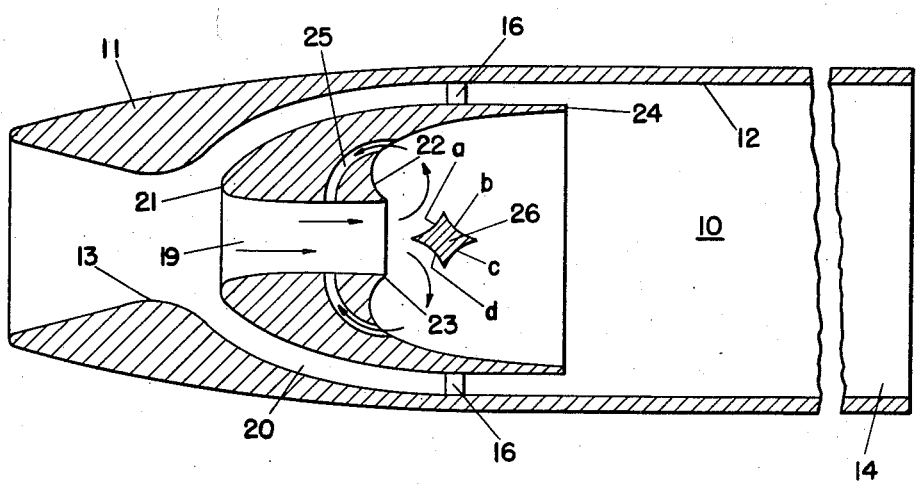
Figs. 3 and 4 are views similar to Fig. 1 of modifications of the invention.
Figure 4:
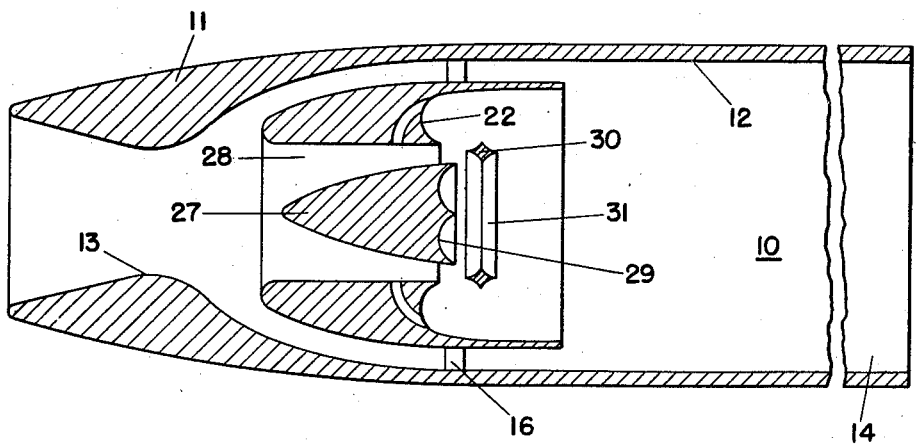

Fig. 3 is similar in all respect to Fig. 1 but differs therefrom in the provision of a passageway 25 located within baffle 15 providing communication between cavity wall 22a of baffle 15 and axial passageway 19 which functions to bleed off any thickened boundary layer adjacent cavity wall 22 and prevent collapse of the vortex. In addition, a single directional baffle 26 is disposed at the outlet of axial passage 19, and passageway 25 and baffle 26 may be used independently of each other. Baffle 26, circular in vertical cross-section, has outer concave surfaces indicated at a, bc, c, and d, which provide deflectors for the inlet air and combustion gases toward cavity wall 22 and effect a swirling action therein. Surfaces a and d of baffle 26 aid in forming vortices adjacent the cavity wall while surfaces b and c function similarly in forming reverse vortices therein, upon combustion. Baffle 26 is secured to inner casing 12 by struts (not shown). A conical baffle 27, also circular in vertical cross-section, and having a ring-shaped cavity wall 29 at its downstream end, is disposed axially of the engine casing and interiorly of baffle 15 providing annular passageway 28 for the longitudinal flow of the inlet fluid into the combustion chamber 10. In addition, a ring-like directional baffle 30 is disposed at the outlet of passageway 28 and functions similarly as baffle 26 but having a central opening 31 permitting combustion gases passing therethrough to be effectively blocked by wall 29 of baffle 27. Conical baffle 27 and ring-like baffle 30, are secured to inner casing 12 by struts (not shown).

In operation, the intake air in passing the venturi nozzle encounters baffle 15. Secondary air passes between the outer surface 17 and inner casing 12, the major portion, however, being directed into the axial opening 19 provided by the baffle 15 or into passageway 28 when conical baffle 27 is used. As shown in Figs. 1 and 3, vortices are formed adjacent the cavity 22 and have a direction as indicated by the arrowed lines.

Upon combustion, a pressure rise occurs in the combustion area causing an adverse pressure differential between the area of combustion and the inlet end causing the reverse flow of gases to the inlet end to be blocked and enabling combustion gases to be discharged through the exhaust at high speeds. The vortices formed by the incoming primary air are of such magnitude that when encountered by the adverse pressure differential, will tend to reverse themselves. Therefore, the combustion gases are effectively blocked from leaving the inlet end by these vortices rather than by mechanical inlet valves. Baffles 26, 27, and 30 promote formation of reverse directional vortices of combustion gases as well as directional vortices of intake air, thus effectively blocking their discharge at the inlet end and increasing the forward thrust of the jet. It should be borne in mind that passageway 25 or baffle 27 may be used independently of each other, their use dictated by the physical shape and size of the pulse jet engine, while baffle 30 will be used only when baffle 27 is present. Of course, baffle 15 must necessarily be present when any, none, or all of the additional baffles or passageway 25 are employed.

Obviously, many modifications and variations of the present invention are possible in the light of the above teachings. For example, the invention may be used advantageously as a combustor for gas turbines, jet engine afterburner combustors, thrust units on helicopter blades, etc. It is therefore to be understood that within the scope of the appended claims, the invention may be practiced otherwise than as specifically described.

What is claimed is:

1. A jet propulsation motor comprising a tubular casing having an open inlet end and an open exhaust end providing a combustion zone therebetween, a baffle disposed between said casing inlet end and the combustion zone, said baffle having an axial passageway therein for the supply of primary air to the combustion chamber and an outer wall spaced from the inner wall of the casing providing an outer passageway for the supply of secondary air to the combustion chamber, said axial passageway having a forward portion of relatively narrow transverse cross-section merging with a rearward portion of relatively wide transverse cross-section and forming a forward narrow ringlike cusp, said baffle terminating adjacent the combustion chamber in an enlarged rearward ringlike cusp and providing with said inner cusp an outwardly flaring wall and said outwardly flaring wall having an annular cavity therein adjacent said forward cusp for directing exhaust gases toward the exhaust end of the casing.

2. Apparatus as in claim 1, further characterized by a passageway in said baffle providing communication between the forward and rearward portions of the axial passageway.

3. Apparatus as in claim 2, further characterized by deflector means in the rearward portion of the axial passageway for directing primary air toward the annular cavity prior to its passage to the combustion chamber.

References Cited in the file of this patent

UNITED STATES PATENTS

| | | |
|---|---|---|
| 2,563,024 | Goddard | Aug. 7, 1951 |
| 2,639,580 | Stuart | May 26, 1953 |
| 2,731,795 | Bodine | Jan. 24, 1956 |
| 2,795,931 | Le Foll | June 18, 1957 |